US007528769B2

(12) United States Patent
Wirola

(10) Patent No.: US 7,528,769 B2
(45) Date of Patent: May 5, 2009

(54) ENHANCING THE USABILITY OF CARRIER PHASE MEASUREMENTS

(75) Inventor: Lauri Wirola, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/605,934

(22) Filed: Nov. 27, 2006

(65) Prior Publication Data

US 2008/0122686 A1 May 29, 2008

(51) Int. Cl.
G01S 1/00 (2006.01)
G01S 5/02 (2006.01)
G01S 5/14 (2006.01)

(52) U.S. Cl. ............................ 342/357.02; 342/357.11; 342/357.14

(58) Field of Classification Search ................................ 342/357.01–357.17
See application file for complete search history.

(56) References Cited

U.S. PATENT DOCUMENTS

2003/0216864 A1* 11/2003 Fukuda et al. .............. 701/216
2006/0033657 A1* 2/2006 Lawrence et al. ...... 342/357.11
2007/0085738 A1* 4/2007 Whitehead et al. ..... 342/357.04
2007/0126629 A1* 6/2007 Krikorian et al. ........... 342/359

FOREIGN PATENT DOCUMENTS

WO WO 2006/043123 4/2006

OTHER PUBLICATIONS

"GPS Antenna Design Characteristics for High-Precision Applications;" James M. Tranquilla et al; Journal of Surveying Engineering, vol. 115, No. 1, Feb. 1989.
PCT/IB2006/051714, May 30, 2006, PCT.
PCT/IB2006/053366, Sep. 19, 2006, PCT.

* cited by examiner

*Primary Examiner*—Thomas H Tarcza
*Assistant Examiner*—Harry Liu
(74) *Attorney, Agent, or Firm*—Alfred A. Fressola; Ware, Fressola, Van Der Sluys & Adolphson LLP

(57) ABSTRACT

An orientation of a mobile first antenna is determined based at least on sensor information. Further, a computational compensation of a difference between the orientation of the first antenna and an orientation of a second antenna is caused, for reducing an influence of this difference on calculations using carrier phase measurements of satellite signals received by the first antenna and the second antenna.

33 Claims, 6 Drawing Sheets

ENHANCING THE USABILITY OF CARRIER PHASE MEASUREMENTS

FIELD OF THE INVENTION

The invention relates to enhancing the usability of carrier phase measurements of satellite signals, for example in the scope of a relative positioning.

BACKGROUND OF THE INVENTION

An absolute positioning of a device is supported by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems. The satellites of these systems are also referred to as space vehicles (SV).

The constellation in GPS, for example, consists of more than 20 satellites that orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC). A GPS receiver of which the position is to be determined receives the signals transmitted by the currently available satellites, and it detects and tracks the channels used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time.

In one possible solution scheme, the offset between satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

In a further approach known as Real Time Kinematics (RTK), the carrier phases and/or the code phases measured at two GNSS receivers are evaluated for determining the distance and attitude between the two receivers very accurately, typically at cm- or even mm-level accuracy. The combination of the distance and attitude between two receivers is also referred to as baseline. The carrier phase measurements that are performed at GNSS receivers for an RTK positioning may be exchanged in real-time or be stored for a later exchange known as post-processing. Usually, one of the GNSS receivers is arranged at a known location and called reference receiver, while the other receiver is to be positioned with respect to the reference receiver and called user receiver or rover. The determined relative position can further be converted into an absolute position, if the location of the reference position is accurately known. However, the RTK calculations actually require that the positions of both receivers are known at least approximately. These positions can be obtained from determined pseudoranges. Alternatively, it would also be sufficient to know only a reference location approximately, since the rover location can be obtained therefrom by adding the baseline estimate to the reference location.

A satellite signal is distorted on its way from a satellite to a receiver due to, for instance, multipath propagation and due to influences by ionosphere and troposphere. Moreover, the satellite signal has a bias due to the satellite clock bias. All errors that are common to a signal in both receivers can be assumed to correlate between the receivers and satellites, and thus to vanish in double differencing.

The relative positioning may thus be based more specifically on signal measurements at two GNSS receivers, which are used to form double difference observables. Such signal measurements may include for example carrier phase measurements and PRN code measurements, etc. A double difference observable relating to the carrier phase is the difference in the carrier phase of a specific satellite signal at both receivers compared to the difference in the carrier phase of another satellite signal at both receivers. A double difference observable relating to the PRN code may be obtained correspondingly. The double difference observables can then be employed for determining the position of the receivers relative to each other at high accuracy.

With conventional GNSS positioning, two GNSS receivers are able to determine their location, and therefore the baseline between them, with an accuracy of 5 to 20 meters. The RTK approach, in contrast, allows determining the baseline with a much higher accuracy of 0.1 to 10 cm. It is noteworthy that this accuracy can be achieved with standard commercial GNSS-receivers.

When using the RTK approach, however, it has to be considered that a code or carrier phase measured at two receivers is based on different number of whole cycles of the carrier. This effect is referred to as double-difference integer ambiguity, which has to be solved. This process is also called integer ambiguity resolution or initialization.

The double-difference integer ambiguity may be resolved by gathering carrier and/or code phase data from a sufficient number of satellites at sufficient measurement instants. The solution may be obtained using individual epochs or as a continuous process using filters.

Once the baseline has been determined and the integer ambiguity been resolved, the integer ambiguity solution may be validated in order to determine whether it can be relied on. Integer ambiguity validation is typically done using statistical tools.

The solved and validated integer ambiguities may then be used for tracking the baseline between the receivers at high precision, for instance with a sub-cm accuracy.

Originally, RTK positioning was only available for geodesic surveying and other applications requiring a high accuracy. The equipment required for such applications is expensive and meant, therefore, only for professional use. In these cases, the baseline is moreover often determined off-line. However, it is also possible to obtain a high-precision baseline using two low-cost GNSS-enabled handsets, for example terminals with integrated GNSS-receiver or terminals equipped with an external Bluetooth GNSS-receiver. The data between the terminals can be exchanged using any kind of data transfer technology, like general packet radio service (GPRS), wireless local area networks (WLAN) or Bluetooth™. This allows the baseline to be determined and updated in real-time. This approach is also called mobile Real-Time Kinematics (mRTK), indicating that mobile technology is used to expand the RTK use cases and bring the benefits of the technology to a wider audience.

SUMMARY

The invention proceeds from the consideration that while common errors to satellite signals received by different antennas are canceled out in double differencing, additional errors are introduced by the receiving event, that is, on the path from the surface of the antenna to the feed cable or feed path. Of these errors, only those that are common to all the satellites cancel out in double differencing, like, for instance, receiver noise and receiver time bias.

In addition, however, an antenna having an anisotropic complex frequency response may generate an error in the measured carrier phase of a received signal. This error is dependent on the direction of the satellite with respect to the antenna axis. This means that depending on the receiving direction of the satellite signal, a bias is induced on the carrier phase observable. This bias has an effect on relative positioning computations, in case it is not the same at both receivers. If the bias difference is large, meaning in the order of tens of degrees, the baseline determination may fail. Even if a baseline determination is possible, it may be unreliable due to the systematic errors in the carrier phase observables.

The problem is of particular relevance when the antenna is integrated in a mobile device, in which case the antenna may have an arbitrary orientation.

High-quality antennas may have a fairly isotropic phase response. With such antennas, errors in the carrier phase measurements can be avoided. However, high-quality antennas are expensive. Thus, they are suited mainly for professional use cases. In particular in mobile terminals, the antenna solutions are often sub-optimal, and the phase responses may be highly anisotropic.

With such sub-optimal antennas, errors in the carrier phase measurements can be minimized, if a user is required to set the antennas of both devices to a predetermined orientation. When the two antennas are aligned in the same direction, the phase errors are similar to both receivers and the errors cancel out in the double differencing process. However, in mobile relative positioning applications, a user may not always have access to both antennas.

A method is described, which comprises determining an orientation of a mobile first antenna based at least on sensor information. The method further comprises causing a computational compensation of a difference between the orientation of the first antenna and an orientation of a second antenna for reducing an influence of this difference on calculations using carrier phase measurements of satellite signals received by the first antenna and the second antenna.

The expression 'causing a computational compensation' is to be understood such that the computational compensation is either performed or that instructions for such a computational compensation are provided.

Moreover, an apparatus is described, which comprises a processing component configured to determine an orientation of a mobile first antenna based at least on sensor information. The processing component is further configured to cause a computational compensation of a difference between the orientation of the first antenna and an orientation of a second antenna for reducing an influence of this difference on calculations using carrier phase measurements of satellite signals received by the first antenna and the second antenna.

The processing component can be implemented in hardware and/or software. It may be for instance a processor executing software program code for realizing the required functions. Alternatively, it could be for instance a circuit that is designed to realize the required functions, for instance implemented in a chipset or a chip, like an integrated circuit. The described apparatus can be for example identical to the comprised processing component, but it may also comprise additional components. The apparatus could further be for example a module provided for integration into an electronic device, like a wireless communication device or a GNSS accessory device.

Moreover, an electronic device is described, which comprises the described apparatus and in addition the first antenna. Such an electronic device could be for instance a mobile terminal, an accessory device for a mobile terminal or a satellite receiver, etc. The electronic device could comprise in addition an interface enabling a communication with another electronic device.

Moreover, an arrangement is described, which comprises a first device including the described apparatus and in addition a second device including the first antenna. The first device could be for example a mobile terminal and the second device an accessory device for the mobile terminal, etc.

Moreover, a system is described, which comprises a first device including the described apparatus and a second device comprising the mentioned second antenna. The first device could be for example a mobile device like a mobile terminal, an accessory to a mobile terminal or a satellite receiver, etc. The second device could be for example another mobile device, like a mobile terminal, an accessory to a mobile terminal or a satellite receiver, or a fixed device, like a base station, a network server or a local measurement unit, etc.

Finally, a computer program product is described, in which a program code is stored in a computer readable medium. The program code realizes the described method when executed by a processor. The computer program product could be for example a separate memory device, or a memory that is to be integrated in an electronic device.

The invention is to be understood to cover such a computer program code also independently from a computer program product and a computer readable medium.

Knowing now the antenna response, that is, the complex frequency response function as a function of azimuth and elevation angles with respect to the antenna axis, allows for compensating the phase offsets induced by the anisotropic antenna response.

The invention thus provides a possibility of compensating for undesired, non-common phase offsets in carrier phase measurements from the signals received by two antennas, of which at least one may be non-optimal. Using sensor information for determining the orientation of the first antenna enables such a compensation as well for a mobile first antenna.

As a result of the compensation, cheaper antennas having a lower quality can be utilized without negative effect on calculations using the carrier phase measurements.

In one exemplary embodiment, at least two different options are provided for reducing an influence of a difference between the orientation of the first antenna and the orientation of the second antenna on calculations using carrier phase measurements of satellite signals received by the first antenna and the second antenna. One of the options can then be selected. In case a first one of the options is selected, the above mentioned computational compensation of a difference between the orientation of said first antenna and the orientation of the second antenna is caused. In case a second one of the options is selected, an alignment of the antennas is initiated to obtain equal orientations of the first antenna and the antenna.

There may be various criteria for selecting the first or the second option.

In one exemplary embodiment, the second option is selected in case the first antenna and the second antenna receiving satellite signals are suited to be aligned, while the first option is selected otherwise.

For supporting the second option, an indication of a type of the second antenna may be received. It may then be determined that the first antenna and the second antenna are suited to be aligned in case the first antenna and the second antenna are of a same type and an alignment of at least one of the antennas is supported. If identical antennas are aligned, the antenna phase response asymmetry is removed in double differencing.

In another exemplary embodiment, in general the first option may be selected. The second option may then be selected only in case a computational compensation has not been successful. If the type of the antennas is known, the second option might be selected only in case identical antennas are concerned, because otherwise, even with aligned antennas the antenna phase response asymmetry cannot be expected to be removed in double differencing.

Initiating an alignment may comprise instructing a user to align the first antenna. A first antenna in a mobile terminal, for instance, may often be considered a compromise. While a car can have a patch place on a large ground plane, which is an omni-directional horizontal optimum, a terminal tends to have a much smaller antenna construction, which means that the mass of the ground plane is the dominant factor. Most users hold a mobile terminal vertical or near vertical, which will not provide an omni-directional response or the best phase response to all possible points of transmission in the sky. In such a case, in which a predominately horizontal antenna type is used, the simplest instruction to a user could thus be to lay or hold the mobile terminal horizontally. It is to be understood, though, that various other instructions may be implemented as well.

Alternatively, initiating an alignment may comprise requesting another device to cause an alignment of the second antenna. The other device may then cause an alignment for instance by selecting one of several available antennas as the second antenna, by steering the second antenna to assume an orientation similar to the orientation of the first antenna or by instructing a user to align the second antenna. It is also possible to combine several approaches. For example, a user could first be instructed to align the first antenna, and another device could then be requested to cause an alignment of the second antenna to compensate for a remaining deviation between the orientations of the first antenna and the second antenna.

According to a further embodiment, another device may also be requested to select one of different available antennas as the second antenna such that the second antenna is of the same type as the first antenna. The other device may, for example, have access to antennas of different common types which belong to one or more antenna arrays.

It is to be understood that receiving an indication of an orientation of a first antenna receiving satellite signals and causing an alignment of a second antenna receiving satellite signals in accordance with the indication of an orientation of the first antenna and/or selecting an antenna of an indicated type can also be considered as an independent approach that may be implemented separately in a device.

The orientation of the first antenna could be determined in a global coordinate system. This could be sufficient, if the first antenna and the second antenna are of the same type. Alternatively or in addition, determining the orientation of the first antenna may comprise determining the orientation relative to a path of satellite signals received by the first antenna. This can be achieved by taking into account not only sensor information but in addition information on the current position of satellites from which signals are received. Satellite positions can be calculated in a global coordinate system using ephemeredes from satellite signals or from assistance data. The positions can then be converted to the antenna coordinate system by using the antenna orientation information, which is available from sensor information.

Causing a computational compensation may comprise correcting the carrier phase measurements themselves by canceling a phase offset.

It would be possible, for instance, to cancel a phase offset in carrier phase measurements of satellite signals received by the first antenna compared to carrier phase measurements of the satellite signals received by the first antenna that would result with a predetermined orientation of the first antenna. This approach can be used for instance in case the orientation of the second antenna is fixed and corresponds to the predetermined orientation.

Alternatively, it would be possible to cancel a phase offset in carrier phase measurements of satellite signals received by the first antenna compared to carrier phase measurements of the satellite signals received by the first antenna that would result if the orientation of the first antenna was equal to the orientation of the second antenna. This approach allows taking account as well of variable orientations of the second antenna.

In addition, phase offsets caused by different antenna types can be taken into account in the compensation. To this end, antenna carrier phase patterns for different antenna types may be considered.

In case the same entity, which determines the orientation of the first antenna, performs the computational compensation or causes the alignment, it could receive to this end an indication of the orientation of the second antenna.

Compensated carrier phase measurements could be used in calculating a relative position between the first antenna and the second antenna. The relative positioning could be based forming double-differences and integer ambiguity resolution. With the compensation, the baseline accuracy is improved, because a significant error source is removed. Moreover, the integer ambiguity resolution process becomes more reliable, since double difference measurements become non-biased. The resolution process assumes that the double-difference observables are normally distributed and non-biased. However, the phase error from the anisotropic phase response results in the violation of this assumption and leads to failures in the resolution. This problem is alleviated with the described approach.

In case causing the computational compensation comprises correcting carrier phase measurements of signals received by the first antenna, the corrected carrier phase measurements could also be transmitted to a device having access to carrier phase measurements of the second antenna for a relative positioning between the first antenna and the second antenna.

It is to be understood that it is not required that the carrier phase measurements themselves are corrected by the computational compensation. The compensation could also be realized in the scope of the calculations using the carrier phase measurements. For example, in case double-differences are formed from the carrier phase measurements for a relative positioning, causing the computational compensation could comprise correcting these double differences.

New satellite systems bring about new frequencies in addition to current GPS L1, which further improves the mRTK capabilities. However, the new frequencies also introduce the need to compensate for the phase errors between signals at different frequencies, although they might be received with the same antenna. For example, if GPS L1 and L2 are used to form the wide lane observable, the phase offset between L1 and L2 frequencies should be compensated for. This is because the phase response is also a function of frequency.

The entity causing or performing an alignment and/or a computational compensation could therefore also receive an indication of the type of the satellite signals received by the second antenna. This indication could be used as an additional criterion for selecting one of the available options. Further, this indication could be used for causing or performing in addition a compensation of the influence of a difference between a frequency of a type of signals received by the first antenna and a frequency of the type of signals received by the second antenna on carrier phase measurements.

The described apparatus or the described electronic device may further comprise at least one sensor providing information indicative of an orientation of the first antenna. Sensors can be used to deduce an orientation of an antenna, including direction, tilt and yaw, in a global coordinate system. Such at least one sensor may comprise a three-dimensional (3D) accelerometer providing an angle between the antenna plane and a vector pointing to the centre of the Earth. Such at least one sensor may further comprise a 3D compass providing the direction of an antenna axis in the horizontal plane. Such at least one sensor may further comprise a gyroscope, etc.

The invention can be employed for example in high-precision navigation and surveying applications. It can be provided for professional use, but also for fun applications, such as writing with a GNSS receiver.

It is to be understood that the invention can also be employed for a positioning of more than two GNSS receivers relative to each other. In this case, a computational compensation could be performed for all or some of the receivers and/or all or some of the receivers could be caused to be aligned to each other.

The invention can further be used with any kind of satellite signals, in particular, though not exclusively, with satellite signals transmitted in a GNSS, like GPS, GLONASS, GALILEO, SBAS, QZSS, LAAS or a combination of these. LAAS has the advantage that it enables the use of mRTK under indoor conditions as well.

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

FIGS. 1 to 4 illustrate the influence of a misalignment between two GNSS antennas that are used in an RTK positioning.

Figure 1:
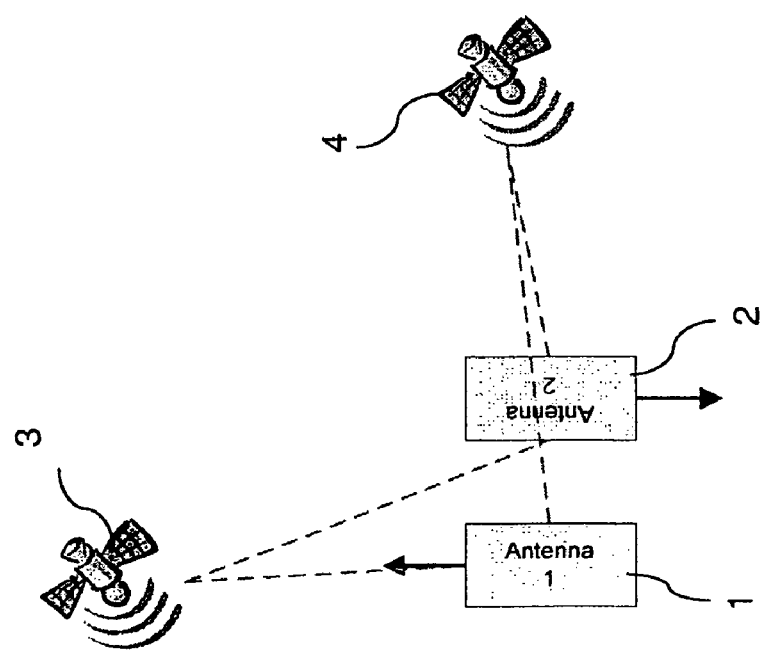
FIG. 1 is a schematic diagram illustrating a situation with differently oriented GNSS antennas.

FIG. 1 is a diagram illustrating an exemplary constellation with two GPS satellites 3, 4 and two receiver antennas 1, 2. The antenna axes point to different directions. The measured carrier phases of received satellite signals depend on the distance of the satellites 3, 4 from the antennas 1, 2, but in addition on the angle between a respective antenna axis and the direction of arrival of the received signals, which are indicated in FIG. 1 with dashed lines.

As mentioned above, Real-Time Kinematics is based on solving the double-difference integer ambiguities. The problem formulation may lead to an exemplary measurement equation given by $$\phi_{km}^{pq} = \rho_{km}^{pq} + \lambda N_{km}^{pq} + \epsilon_{km}^{pq}, \qquad (1)$$

where $\phi_{km}^{pq}$ is the double difference observable defined by $\phi_{km}^{pq} = (\phi_k^p - \phi_m^p) - (\phi_k^q - \phi_m^q)$, where $\phi_k^p, \phi_m^p, \phi_k^q, \phi_m^q$ are the carrier phase measurements by the receivers k and m of the signals originating from the satellites p and q.

Moreover, $\rho_{km}^{pq}$ is the difference of geometric ranges defined by $$\rho_{km}^{pq} = (\rho_k^p - \rho_m^p) - (\rho_k^q - \rho_m^q)$$
$$= (\|\underline{x}^p - \underline{x}_k\| - \|\underline{x}^p - (\underline{x}_k + \underline{b})\|) - (\|\underline{x}^q - \underline{x}_k\| - \|\underline{x}^q - (\underline{x}_k + \underline{b})\|),$$

where $\underline{x}^p$ and $\underline{x}^q$ are the positions of the satellites p and q, respectively. $\underline{x}_k$ is the position of the reference receiver and $\underline{b}$ is the unknown baseline to be determined. Finally, $\lambda$, $N_{km}^{pq}$ and $\epsilon_{km}^{pq}$ are the wavelength, unknown double difference ambiguity (note that $N_{km}^{pq} \in \aleph^{n \times 1}$) and double-difference measurement noise, respectively.

It has to be noted that time variable has been dropped from the equations for the sake of clarity. However, accounting for different measurement instants and time-of-flight differences between the receivers may be required for a determination of the baseline. Further, it has to be noted that presented equation (1) represents a simplified form of a measurement equation, which may be modified and extended in various ways.

Solving equation (1), which can be realized with any suitable approach, yields the fixed baseline estimate $\underline{b}$ and double-difference ambiguities $\underline{N}$.

As mentioned above, using double differences has the advantage that double differencing errors that are common to a given satellite signal in two receivers cancel out. Examples for such common errors comprise satellite clock bias as well as errors induced by the troposphere and the ionosphere.

However, additional errors are introduced by the receiving event, that is, on the path from the surface of the antenna to the feed cable or path.

In general, the antenna of a GNSS receiver generates an error in the phase of the signal that is dependent on the direction of the satellite with respect to the antenna axis. This error is caused by an anisotropic complex frequency response of the antenna. This means that depending on the receiving direction of the signal, a bias is induced in the carrier phase observable. If these errors are big, that is, in the order of tens of degrees, and are not compensated for, the baseline determination will fail.

Figure 2:
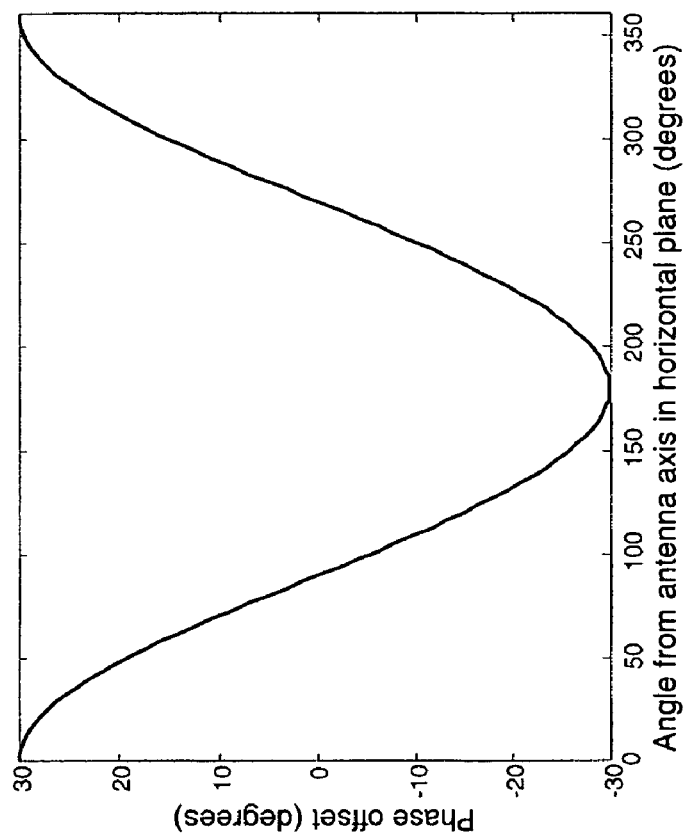
FIG. 2 is a diagram illustrating the phase response of a GPS antenna as a function of the angle of the antenna axis from the north in the horizontal plane.

FIG. 2 is a diagram presenting a fictional phase response of the receivers 1, 2 of FIG. 1 as a function of the SV angle from the antenna axis in the horizontal plane. An elevation dependence of the response, which would be relevant in a real application as well, has been neglected. The maximum amplitude of the phase response can be obtained from the document "GPS Antenna Design Characteristics for High-Precision Applications", Journal of Surveying Engineering, Vol. 115, No. 1, February 1989, by J. M. Tranquilla and B. G. Colpitts. In this document, the authors also found that the phase response of certain antennas may deviate as much as 60 degrees, as illustrated.

Figure 3:
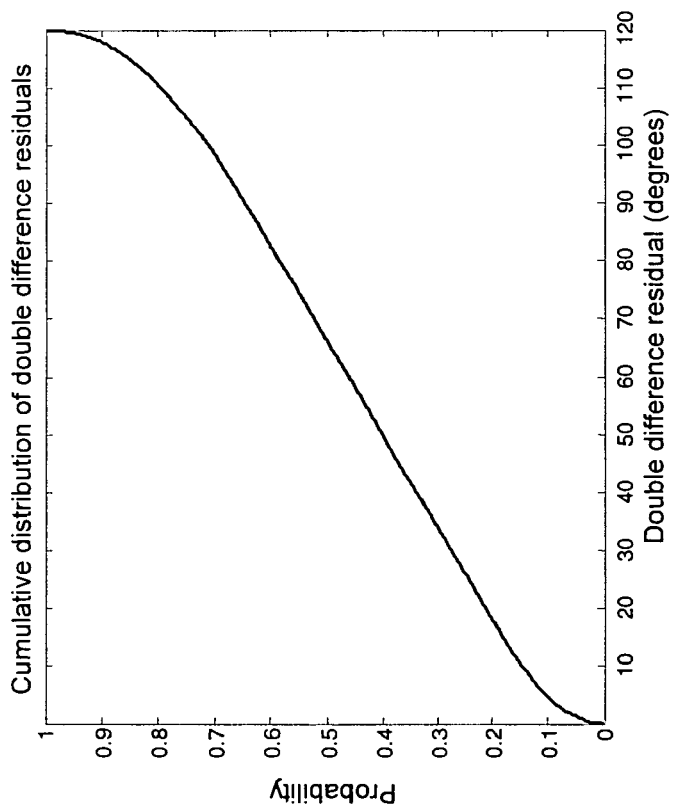
FIG. 3 is a diagram illustrating the cumulative distribution of double difference residuals.

FIG. 3 is a diagram representing simulation data for different satellite constellations with the receiver arrangement illustrated in FIG. 1. A zero-meter baseline between the antennas 1, 2 has been simulated, while the phase responses of the antennas 1, 2 correspond to the phase response illustrated in FIG. 2. With a baseline of zero and identical antenna axes, there should be no double-difference residuals. In FIG. 1, however the antennas 1, 2 are arranged with differently orientated axes. FIG. 3 presents the resulting probability of double-difference residuals between zero and 120 degrees. The double-difference residuals show that in the situation modeled, double difference observables may be in error by as much as ⅓ cycle or 120 degrees, which is expected, since the maximum error is 4*60/2 degrees.

Figure 4:
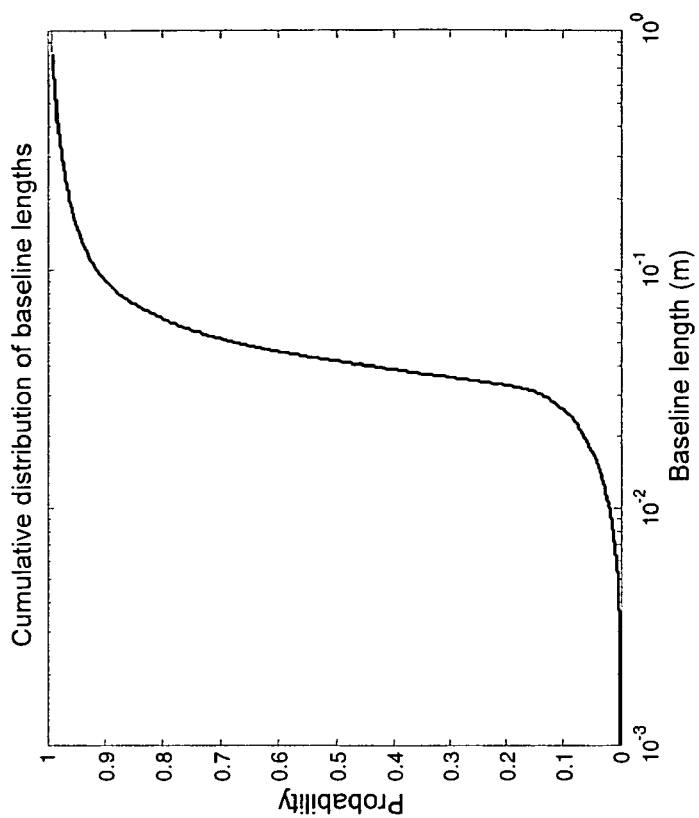
FIG. 4 is a diagram illustrating the cumulative distribution of baseline lengths.

FIG. 4 is a diagram presenting the effect of the double difference residuals of FIG. 3 on the determined baseline. The diagram shows the cumulative distribution of baseline lengths in meters. 90% of the time, the phase error contributes an error of less than 10 cm to the baseline length. However, significant deviations from the true length of zero meters occur also. Since the true baseline length was set to zero meters, the distribution also represents the length error in the present case.

The problem of double difference residuals may be solved by ensuring that the antennas are aligned or that the effect of a misalignment is compensated computationally. This requires information on the direction of the satellites with respect to the antenna axis and on the antenna phase response as a function of azimuth and elevation. The satellite positions in the global coordinate system can be calculated based on the ephemeredes in the received satellite signals. The phase response may be measured, modeled or provided by the manufacturer. The antenna axis direction in a global coordinate system can be determined based on sensor information.

Figure 5:
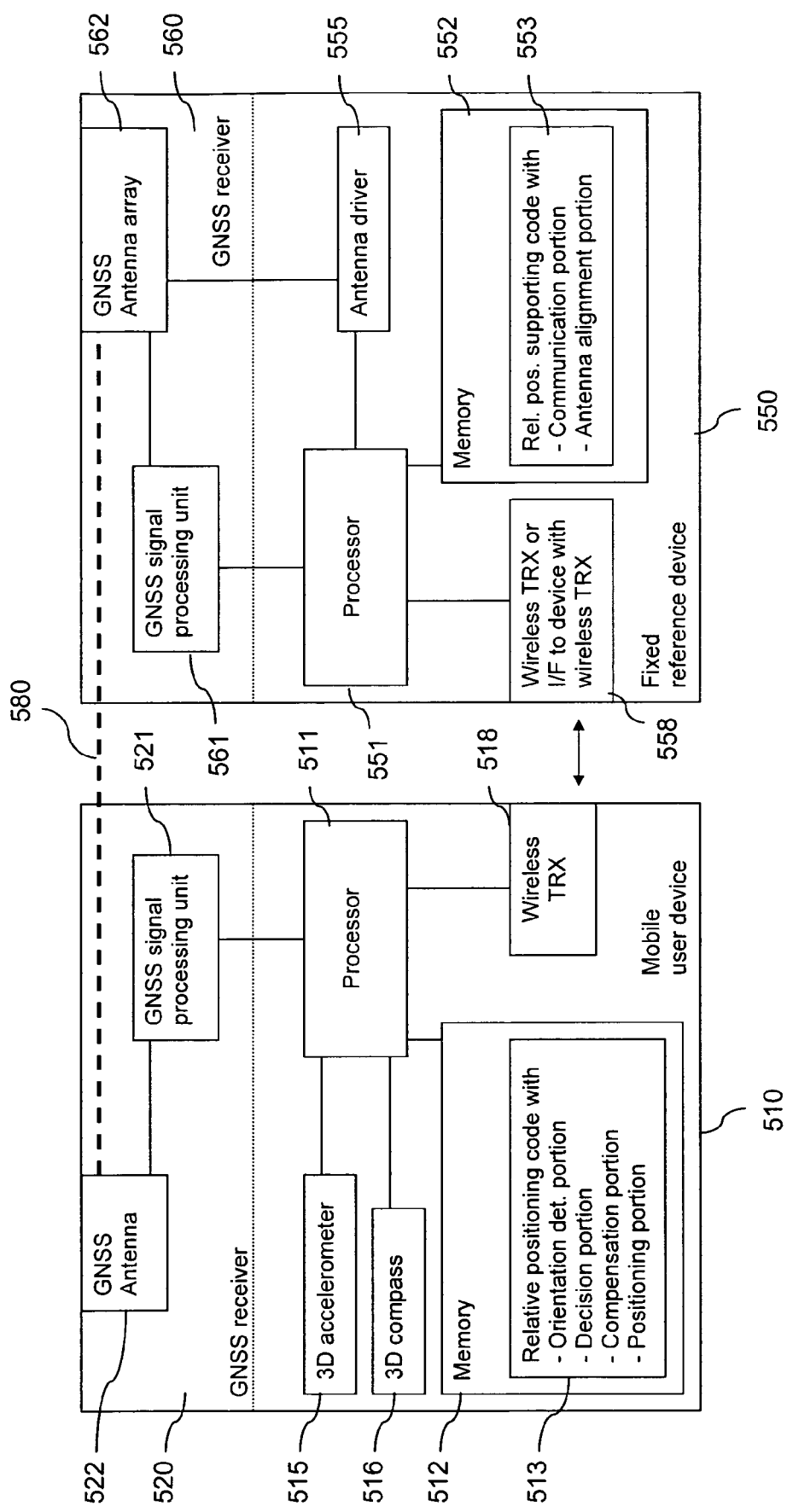
FIG. 5 is a schematic block diagram of a system according to a first embodiment of the invention.

FIG. 5 is a schematic block diagram of a first exemplary system, which allows reducing double difference residuals and thus enhancing the use of code phase measurements in accordance with an embodiment of the invention.

The system comprises a user device 510 and a reference device 550.

The user device 510 can be for instance a mobile device, like a mobile phone.

The user device 510 comprises a processor 511 and, linked to this processor 511, a memory 512, a 3D accelerometer 515, a 3D compass 516 and a transceiver (TRX) 518.

The processor 511 is further linked via a GNSS signal processing unit 521 to a GNSS antenna 522. GNSS signal processing unit 521 and GNSS antenna 522 form a GNSS receiver 520, which may be integrated in the user device 510. Alternatively, though, it could also belong to an accessory device that is connected to the user device 510. This option is indicated in FIG. 5 by a dotted line between the GNSS receiver components and the other components of user device 510. A GNSS accessory device could be connected to the user device 510 via any suitable link, like a physical connection or a Bluetooth™ link, etc. At least in case the GNSS receiver 520 is an accessory device that is linked to the user device 510 in a flexible manner, though, that is, wirelessly or by wire, the sensors 515, 516 should belong to the GNSS receiver 520 to ensure that a detected orientation corresponds to the orientation of the antenna 522.

The processor 511 is configured to execute implemented computer program code. The memory 512 stores computer program code, which may be retrieved by the processor 511 for execution. The stored computer program codes comprise a relative positioning code 513, which includes functional modules for orientation computations, for decision operations, for compensation operations and for the actual relative positioning operations.

Obviously, the functions of the processor 511 could also be implemented in hardware in the user device 510, for example in the form of an integrated circuit chip.

Further, it is to be understood that functions realized by the processor 511 could also be realized for example by the GNSS signal processing unit 521.

The 3D accelerometer 515 is configured to detect and provide information indicating the angle between the antenna plane and a vector pointing to the centre of the Earth. This is information is based on the acceleration due to gravity, 9.8 ms$^{-2}$, which is also detected by an accelerometer.

The 3D compass 516 is configured to detect and provide information indicating the direction of the antenna axis in the horizontal plane.

The transceiver 518 enables a communication via a wireless link with another devices. The transceiver 518 could belong for instance to a cellular engine of the user device 510 and support an access to a cellular communication network, or it could belong to a WLAN engine of the user device 510 and support an access to a WLAN, etc.

The reference device 550 can be for instance a fixed station, like a base station of a cellular communication network or a WLAN, or a network server linked to such a base station.

The reference device 550 comprises a processor 551 and, linked to this processor 551, a memory 552, an antenna driver 555 and an interface 558.

The processor 551 is further linked via a GNSS signal processing unit 561 to a GNSS antenna array 562. The GNSS antenna array 562 may be omni-directional, comprise different antennas with different orientations or comprise movable antennas. In addition, the GNSS antenna array 562 may comprise selectable antennas of different types. The antenna driver 555 has moreover a controlling access to the GNSS antenna array 562. GNSS signal processing unit 561 and GNSS antenna array 562 form a GNSS receiver 560, which may be integrated in the reference device 550. Alternatively, though, it could also belong to a separate device, like a local measurement unit (LMU), that is connected to the reference device 550. This alternative is indicated in FIG. 5 by a dotted line between the GNSS receiver components and the other components of reference device 550. Such a local measurement unit could be connected to the reference device 550 using any suitable link, for example a wired link.

The processor 551 is configured to execute implemented computer program code. The memory 552 stores computer program code, which may be retrieved by the processor 551 for execution. The stored computer program codes comprise a relative positioning supporting code 553, including functional modules for antenna alignment operations and for relative positioning related communications with a mobile device.

Obviously, the functions of processor 551 could also be implemented in hardware in reference device 550, for example in the form of an integrated circuit chip.

The interface 558 enables a direct or indirect communication with user device 510. If the reference device 550 is a base station of a wireless communication network, for example, the interface 558 could be a transceiver, which enables the reference device 510 to access the wireless communication network. If the reference device 550 is a network server, the interface may be an interface to other network elements, which connect the reference device to a base station of a wireless communication network that may be accessed by the user device 510.

It is to be understood that some components of the reference device 550, like the antenna driver 555, could also belong to the GNSS receiver 560, or that functions realized by the processor 551 could also be realized by the GNSS signal processing unit 561.

The distance and attitude between the user device and the reference device, or more specifically between GNSS antenna 522 and GNSS antenna 562, is represented in FIG. 5 by a dashed baseline 580.

The GNSS receivers 520, 560 are both configured to operate as normal GNSS receivers. That is, they are configured to receive, acquire, track and decode signals transmitted by satellites belonging to one or more GNSSs, like GPS and Galileo. Further, the GNSS signal processing units 521, 561 are configured to compute a stand-alone position in a known manner based on the received satellite signals. It is to be understood that the required computations could also be realized in a processing component outside of the GNSS receivers 520, 560, for example in processor 511 or 551, respectively.

Figure 6:
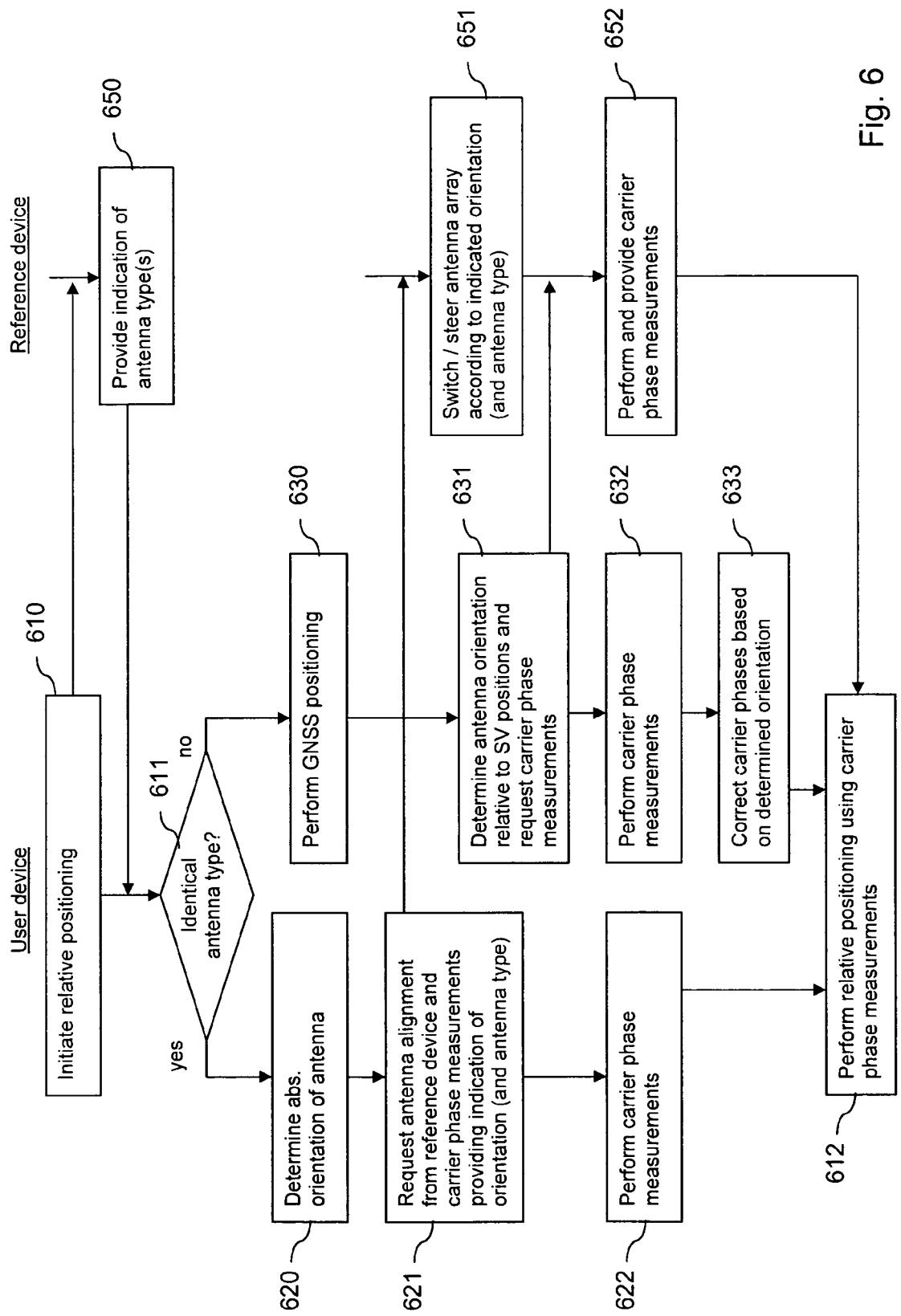
FIG. 6 is a flow chart illustrating an exemplary operation in the system of FIG. 5.

For a particular application, however, the position of user device 510 might have to be determined with a high-precision. To this end, an enhanced mRTK positioning is employed, as illustrated in the flow chart of FIG. 6.

Using computer program code 513, the processor 511 of the user device 510 generates in this case an initialization request, which is transmitted to reference device 550 (step 610).

Using computer program code 553, the processor 551 of the reference device 550 provides to the user device 510 an indication of the type or types of the antennas used in GNSS antenna array 562 (step 650). In addition, the reference device 550 could provide to the user device 510 an indication of the type of signals received by the GNSS antenna array 562.

The processor 511 of the user device 510 now determines whether the user device 510 and the reference device 550 employ identical GNSS antennas (step 611).

In case the reference device 550 provides at least one antenna which is of the same antenna type as the GNSS antenna 522, the processor 511 determines an orientation of the GNSS antenna 522 in a global co-ordinate system using information from the 3D accelerometer 515 and the 3D compass 516 (step 620).

The processor 511 then sends a request to the reference device 550 to perform an antenna alignment and to carry out carrier phase measurements. The request indicates the determined orientation of GNSS antenna 522 and identifies measurement instants at which the measurements are to be performed (step 621). The orientation only has to be provided, though, in case the GNSS antenna array 562 is not omni-directional. In case the GNSS antenna array 562 comprises antennas of different types, the request may indicate in addition the type of the GNSS antenna 522.

Further, the processor 511 causes the GNSS signal processing unit 521 to perform carrier phase measurements at the indicated measurement instants (step 622).

The processor 551 of the reference device 550 receives the request and causes the antenna driver 555 to align the GNSS antenna array 562, unless the GNSS antenna array 562 is not omni-directional (step 651). An alignment may be achieved, for instance, by selecting one of several antennas of the array 562 that has a similar orientation as the indicated orientation of antenna 522. Alternatively, the alignment may be achieved, for instance, by steering an antenna of the antenna array 562 to assume an orientation corresponding to the indicated orientation of antenna 522. In case the GNSS antenna array 562 comprises antennas of different types, the antenna driver 550 further activates only an antenna of the indicated type.

Further, the processor 551 causes the GNSS signal processing unit 561 to perform carrier phase measurements at the indicated measurement instants using an aligned antenna of GNSS antenna array 562. The processor 551 then provides the carrier phase measurements to the user device 510 (step 652).

The processor 511 of the user device 510 is now able to perform relative positioning computations using double difference observations, which are formed from the carrier phase measurements of GNSS signals received by GNSS antenna 522 and an antenna of GNSS antenna array 562 (step 612). Since the antennas have been aligned, the measurements do not contain any phase offset that is caused by a difference in orientation between the antennas.

Finally, the processor 511 could determine an accurate absolute position of the user device 510, or more specifically of the GNSS antenna 522. To this end, the processor 551 of the reference device 550 may provide the user device 510 in addition with a known accurate absolute position of GNSS antenna array 552, for example together with the indication of the antenna type in step 650 or together with the carrier phase measurements in step 652.

In case the type of the GNSS antenna 522 used by user device 510 and the type of the antennas of GNSS antenna array 562 used by reference device 550 is not the same (step 611), in contrast, the processor 511 requests information from a regular GNSS positioning from the GNSS signal processing unit 521, including the position of the satellites from which signals are currently received (step 630).

Then, the processor 511 determines the orientation of the axis of the GNSS antenna 522 relative to the path of arrival of signals received from currently visible satellites using the received information on the satellite positions and information from the 3D accelerometer 515 and the 3D compass 516 (step 631).

Instead of new sensor information, the processor 511 could also use the previously determined absolute orientation of the antenna axis. Further, the processor 511 sends a request to the reference device 550 to carry out carrier phase measurements. The request identifies measurement instants at which measurements are to be performed.

The processor 511 moreover causes the GNSS signal processing unit 521 to perform carrier phase measurements at the indicated measurement instants (step 632).

The processor 511 corrects the resulting carrier phase measurements provided by the GNSS signal processing unit 521 by compensating for a phase offset, which can be expected to result with the determined relative orientation of the antenna axis (step 633). The phase offset is determined from an available phase response of the antenna 522. The phase response may be measured, modeled or provided by the manufacturer, for example in a stored look-up table. It has to be noted that the expected phase offset will be different for each visible satellite. An additional parameter for adjusting the phase offset could be the difference in frequency between the satellite signals received by the GNSS antenna 522 and the GNSS antenna array 562.

Meanwhile, the processor 551 of the reference device 550 receives the request, causes the GNSS signal processing unit 561 to perform carrier phase measurements at the indicated measurement instants and provides the resulting carrier phase measurements to the user device 510 (step 652). Unless the GNSS antenna array 562 is omni-directional, the GNSS signal processing unit 561 selects for these carrier phase measurements for each visible satellite a signal that is received by the respective antenna of the GNSS antenna array 562, which has the best suited orientation. Alternatively or in addition, the processor 551 could equally perform a computational compensation of phase offsets in the received signals.

The processor 511 of the user device 510 is now able to perform relative positioning computations using double difference observations, which are formed from the carrier phase measurements of GNSS signals received by GNSS antenna 522 and GNSS antenna array 562 (step 612). Since the carrier phase measurements provided by GNSS signal processing unit 521 have been corrected in step 633, the measurement results do not contain any phase offset that is caused by a difference in orientation. Finally, the processor 511 could determine an accurate absolute position of the user device 510, or more specifically of the GNSS antenna 522.

It is to be understood that it is not required that the user device 510 performs the positioning computations of step 612 itself. Alternative, it could provide its own carrier phase measurements to the reference device 550 for enabling the processor 551 to carry out the computations.

It may further be noted that in case both devices 510, 550 have access to two-band receivers 520, 560, like GPS L1 and L2 receivers, it is also possible to use both bands in the relative positioning and to compensate for the phase offsets between the L1 and L2 frequencies.

Figure 7:
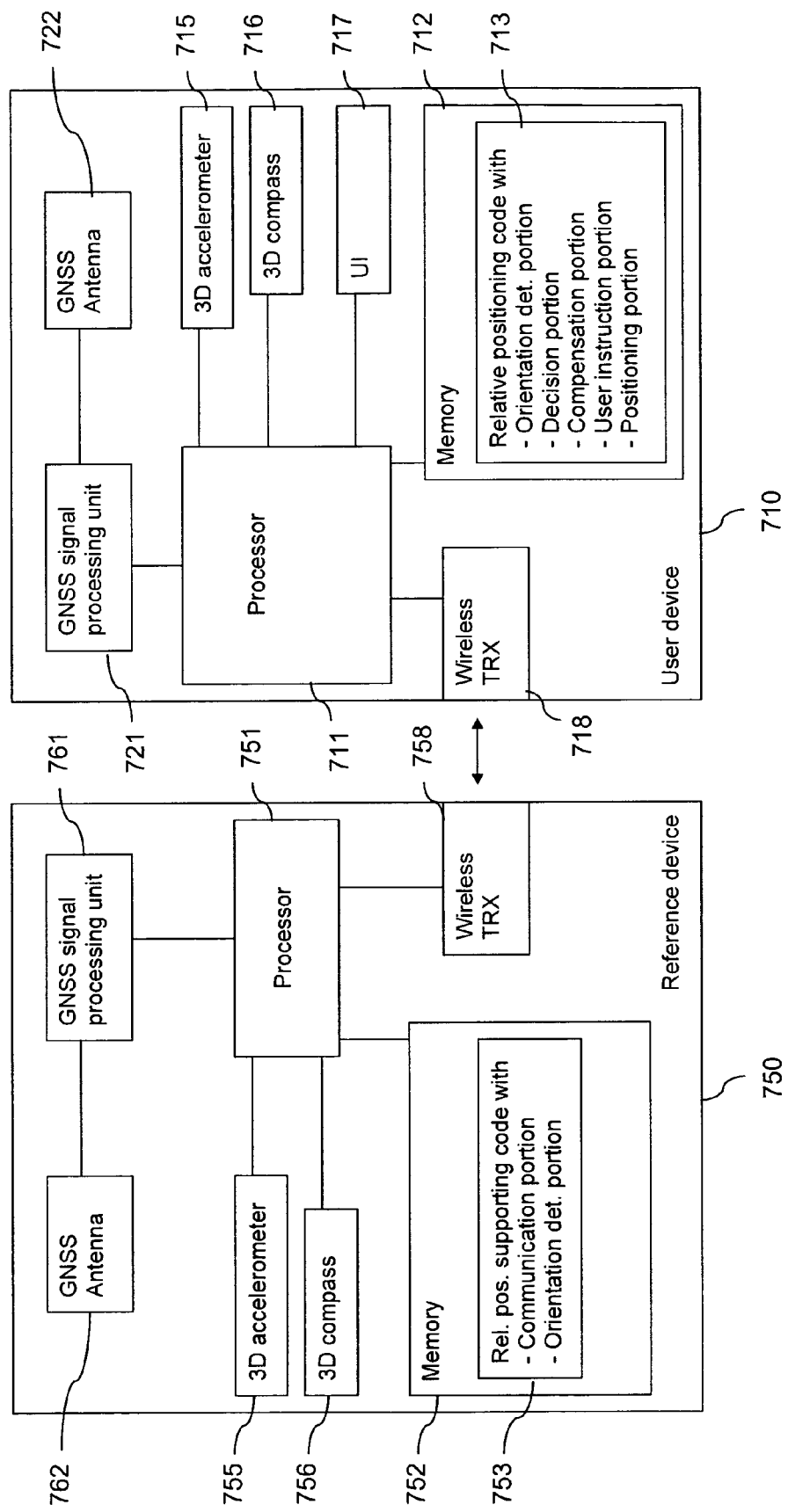
FIG. 7 is a schematic block diagram of a system according to a second embodiment of the invention.

FIG. 7 is a schematic block diagram of a second exemplary system, which allows reducing double difference residuals and thus enhances the use of code phase measurements in accordance with an embodiment of the invention.

The system comprises again a user device 710 and a reference device 750.

The user device 710 can be again for instance a mobile device, like a mobile phone or a laptop. It comprises the same arrangement of components as user device 510, including a processor 711, a memory 712, a 3D accelerometer 715, a 3D compass 716, a transceiver 718 and a GNSS receiver with a GNSS signal process unit 721 and a GNSS antenna 722. In addition, a user interface (UI) is shown, which is equally linked to the processor 711.

The computer program codes stored in the memory 712 may comprise in this case a relative positioning code 713, which includes functional modules for orientation computations, for positioning operations, for decision operations, for compensation operations and for user instructions.

Obviously, the functions of processor 711 could also be implemented in hardware in user device 710, for example in the form of an integrated circuit chip.

The reference device 750 can be as well for instance a mobile device, like a mobile phone or a laptop.

The reference device 750 comprises a processor 751 and, linked to this processor 751, a memory 752, a 3D accelerometer 755, a 3D compass 756 and a transceiver 758.

The processor 751 is further linked via a GNSS signal processing unit 761 to a GNSS antenna 762. GNSS signal processing unit 761 and GNSS antenna array 762 form a GNSS receiver, which may be integrated into the reference device 750 or be external to the reference device 750.

The processor 751 is configured to execute implemented computer program code. The memory 752 stores computer program code, which may be retrieved by the processor 751 for execution. The stored computer program codes comprise a relative positioning supporting code 753 including functional modules for orientation computations and for relative positioning related communications with another device.

Obviously, the functions of processor 751 could also be implemented in hardware in user device 750, for example in the form of an integrated circuit chip.

The transceiver 718 of the user device 710 and the transceiver 758 of the reference device 750 are configured to enable a wireless communication between the devices 710, 750 using a cellular link or a non-cellular link, like a wireless LAN connection, a Bluetooth™ connection, a UWB connection or an infrared connection. The employed communication channel may also be a control plane channel or a secure user plane location (SUPL) channel.

The GNSS receivers 721, 722 and 761, 762 are both configured to operate as normal GNSS receivers. That is, they are configured to receive, acquire, track and decode signals transmitted by satellites belonging to one or more GNSSs, like GPS and Galileo. Further, the GNSS signal processing units 721, 761 are configured to compute a stand-alone position in a known manner based on the received satellite signals. It is to be understood that the required computations could also be realized in a processing component outside of the GNSS receivers, for example in processor 711 or 751, respectively.

Figure 8:
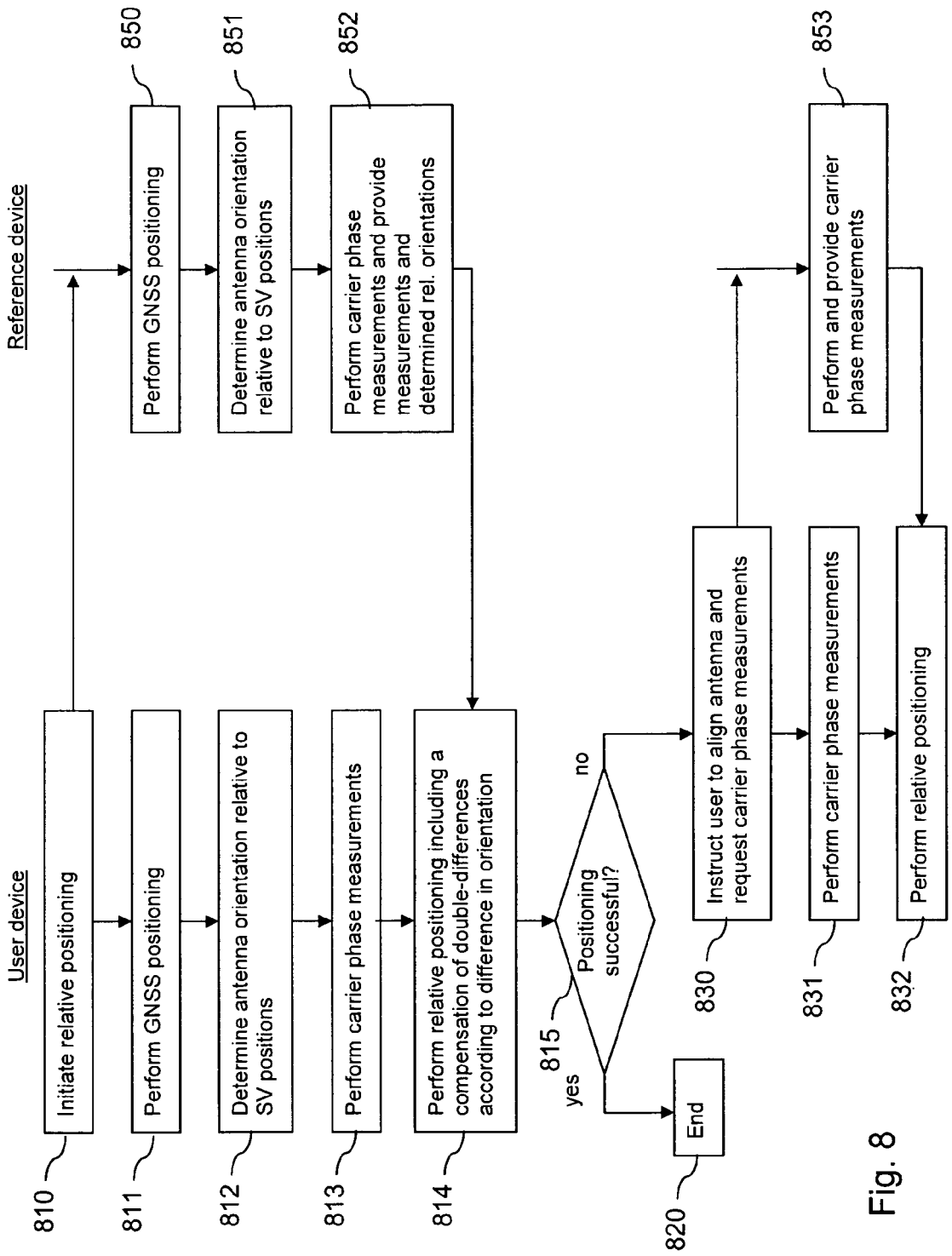
FIG. 8 is a flow chart illustrating an exemplary operation in the system of FIG. 7.

For a particular application, however, the relative position of the user device 710 compared to the reference device 750 might have to be determined with a high-precision. To this end, an enhanced mRTK positioning is employed, as illustrated in the flow chart of FIG. 8.

Using computer program code 713, the processor 711 of the user device 710 generates in this case a relative positioning request, which is transmitted to reference device 750 (step 810). The request identifies measurement instants at which carrier phase measurements are to be performed.

Moreover, the processor 711 requests information from a regular GNSS positioning from the GNSS signal processing unit 721, including the position of the satellites from which signals are currently received (step 811). Then, the processor 711 determines the orientation of the axis of GNSS antenna 722 relative to the path of signals received from currently visible satellites using the received information on the satellite positions and information from the 3D accelerometer 715 and the 3D compass 716 (step 812).

Further, the processor 711 causes the GNSS signal processing unit 721 to perform carrier phase measurements at the indicated measurement instants (step 813).

In the meantime, the processor 751 of the reference device 750 has received the relative positioning request. It uses thereupon computer program code 753 for causing the GNSS signal processing unit 761 to perform a regular GNSS positioning (step 850). Then, the processor 751 determines the orientation of the axis of GNSS antenna 762 relative to the path of signals received from currently visible satellites using the received information on the satellite positions and information from the 3D accelerometer 755 and the 3D compass 756 (step 851).

Further, the processor 751 causes the GNSS signal processing unit 761 to perform carrier phase measurements at the indicated measurement instants (step 852). It provides the carrier phase measurements and an indication of the determined relative orientation for each visible satellite to the user device 710.

The processor 711 of the user device 710 is now able to perform relative positioning computations using double difference observations, which are formed from the carrier phase measurements of GNSS signals received by GNSS antenna 722 and GNSS antenna 762 (step 814). Since the antennas 722, 762 may not have the same relative orientation for a respective satellite, however, the measurement results may contain a phase offset that is caused by the misalignment.

Therefore, the processor 711 corrects the formed double-differences based on the difference between the relative orientations before solving the integer ambiguities. The association between different misalignments and the required corrections may be predetermined and stored in the user device 710, for example in the memory 712.

In case the integer ambiguities can be solved after the compensation and the found solution can be validated (step 815), the relative positioning is completed (step 820).

Otherwise, the processor 711 instructs the user to align the GNSS antenna 722 (step 830). The most common orientations of antennas in handsets are vertical and horizontal, depending on the manufacturer and the product. The instructions to the user could thus simply be "hold the device upright" or "lay the device down onto a horizontal surface". It is to be understood, however, that more differentiated instructions could be provided as well. In addition, the processor 711 sends a new request to perform carrier phase measurements to the reference device 750. The request includes again an indication of the desired measurement instants.

Both processors 711, 751 then cause the respectively associated GNSS signal processing unit 721, 761 to perform carrier phase measurements at the indicated measurement instants (steps 831, 853).

The processor 751 provides the resulting carrier phase measurements to the user device 710.

The processor 711 of the user device 710 is now able to perform relative positioning computations using double difference observations, which are formed from the carrier phase measurements of GNSS signals received by GNSS antenna 722 and GNSS antenna 762 (step 832). Since the antennas 722, 762 have been aligned, the phase offset in the carrier phase measurements that is caused by a difference in relative orientations is minimized.

Performing steps 830, 831, 853 and 832 may be tied as well to the further condition that GNSS antennas 722 and 762 are of the same type and have thus the same phase response, since only this ensures than the alignment will result in a cancellation of phase response asymmetries.

The functions illustrated by the processor 511 executing program code 513 or by the processor 711 executing program code 713 can be viewed as means for determining an orientation of a mobile first antenna based at least on sensor information; and equally as means for causing a computational compensation of a difference between the orientation of the first antenna and an orientation of a second antenna for reducing an influence of this difference on calculations using carrier phase measurements of satellite signals received by the first antenna and the second antenna. Alternatively, the functions illustrated by the functional modules of the program code 513 or the program code 713 can be viewed as such means.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
   determining an orientation of a mobile first antenna based at least on sensor information;
   selecting one of at least two different options for reducing an influence of a difference between said orientation of said first antenna and an orientation of a second antenna on calculations using carrier phase measurements of satellite signals received by said first antenna and said second antenna;

causing a computational compensation of the difference between said orientation of said first antenna and said orientation of said second antenna for reducing an influence of said difference on calculations using carrier phase measurements of satellite signals received by said first antenna and said second antenna in case a first one of said options is selected; and initiating an alignment of said antennas based on said determined orientation of said first antenna, to obtain equal orientations of said first antenna and said second antenna in case a second one of said options is selected.

2. The method according to claim 1, wherein said second option is selected in case said first antenna and said second antenna receiving satellite signals are suited to be aligned and wherein said first option is selected otherwise.

3. The method according to claim 2, further comprising receiving an indication of a type of said second antenna, wherein it is determined that said first antenna and said second antenna are suited to be aligned in case said first antenna and said second antenna are of a same type and an alignment of at least one of said antennas is supported.

4. The method according to claim 1, wherein, in general, said first option is selected and wherein said second option is selected in case a computational compensation has not been successful.

5. The method according to claim 1, wherein initiating an alignment comprises at least one of instructing a user to align said first antenna; and requesting another device to cause an alignment of said second antenna.

6. The method according to claim 1, wherein initiating an alignment comprises requesting another device to cause an alignment of said second antenna, said other device causing an alignment by at least one of:

selecting one of several available antennas as said second antenna;

steering said second antenna to assume an orientation similar to said orientation of said first antenna; and instructing a user to align said second antenna.

7. The method according to claim 1, further comprising requesting another device to select one of different available antennas of different types as said second antenna such that said second antenna is of a same type as said first antenna.

8. The method according to claim 1, wherein determining said orientation of said first antenna comprises determining said orientation in a global coordinate system.

9. The method according to claim 1, wherein determining said orientation of said first antenna comprises determining said orientation relative to a path of satellite signals received by said first antenna.

10. The method according to claim 1, wherein causing said computational compensation comprises canceling a phase offset in carrier phase measurements of satellite signals received by said first antenna compared to carrier phase measurements of said satellite signals received by said first antenna that would result with a predetermined orientation of said first antenna.

11. The method according to claim 1, wherein causing said computational compensation comprises canceling a phase offset in carrier phase measurements of satellite signals received by said first antenna compared to carrier phase measurements of said satellite signals received by said first antenna that would result if said orientation of said first antenna was equal to said orientation of said second antenna.

12. The method according to claim 1, wherein causing said computational compensation comprises correcting carrier phase measurements of signals received by said first antenna, said method further comprising transmitting said corrected carrier phase measurements to a device having access to carrier phase measurements of said second antenna for a relative positioning between said first antenna and said second antenna.

13. The method according to claim 1, wherein said calculations are calculations for a relative positioning between said first antenna and said second antenna, said method further comprising performing said relative positioning calculations.

14. The method according to claim 1, wherein said calculations are calculations for a relative positioning, said method further comprising performing said relative positioning calculations, wherein performing said relative positioning comprises determining double differences from said carrier phase measurements, and wherein causing said computational compensation comprises correcting said double differences.

15. An apparatus comprising a processing component, said processing component being configured to determine an orientation of a mobile first antenna based at least on sensor information;

said processing component being configured to select one of at least two different options for reducing an influence of a difference between said orientation of said first antenna and an orientation of a second antenna on calculations using carrier phase measurements of satellite signals received by said first antenna and said second antenna;

said processing component being configured to cause a computational compensation of the difference between said orientation of said first antenna and said orientation of said second antenna for reducing an influence of said difference on calculations using carrier phase measurements of satellite signals received by said first antenna and said second antenna in case a first one of said options is selected; and said processing component being configured to initiate an alignment of said antennas based on said determined orientation of said first antenna, to obtain equal orientations of said first antenna and said second antenna in case a second one of said options is selected.

16. The apparatus according to claim 15, wherein said processing component is configured to select said second option in case said first antenna and said second antenna receiving satellite signals are suited to be aligned and to select said first option otherwise.

17. The apparatus according to claim 16, wherein said processing component is further configured to receive an indication of a type of said second antenna; and wherein said processing component is configured to determine that said first antenna and said second antenna are suited to be aligned in case said first antenna and said second antenna are of a same type and an alignment of at least one of said antennas is supported.

18. The apparatus according to claim 15, wherein said processing component is configured to select, in general, said first option and to select said second option in case a computational compensation has not been successful.

19. The apparatus according to claim 15, wherein said processing component is configured to initiate an alignment by at least one of:

instructing a user to align said first antenna; and requesting another device to cause an alignment of said second antenna.

20. The apparatus according to claim 15, wherein said processing component is further configured to request another device to select one of different available antennas of different types as said second antenna such that said second antenna is of a same type as said first antenna.

21. The apparatus according to claim 15, wherein said processing component is configured to determine said orientation of said first antenna in a global coordinate system.

22. The apparatus according to claim 15, wherein said processing component is configured to determine said orientation of said first antenna relative to a path of satellite signals received by said first antenna.

23. The apparatus according to claim 15, wherein said processing component is configured to cause said computational compensation by canceling a phase offset in carrier phase measurements of satellite signals received by said first antenna compared to carrier phase measurements of said satellite signals received by said first antenna that would result with a predetermined orientation of said first antenna.

24. The apparatus according to claim 15, wherein said processing component is configured to cause said computational compensation by canceling a phase offset in carrier phase measurements of satellite signals received by said first antenna compared to carrier phase measurements of said satellite signals received by said first antenna that would result if said orientation of said first antenna was equal to said orientation of said second antenna.

25. The apparatus according to claim 15,
wherein said processing component is configured to cause said computational compensation by correcting carrier phase measurements of signals received by said first antenna; and
wherein said processing component is further configured to transmit said corrected carrier phase measurements to a device having access to carrier phase measurements of said second antenna for a relative positioning between said first antenna and said second antenna.

26. The apparatus according to claim 15, wherein said calculations are calculations for a relative positioning between said first antenna and said second antenna, and wherein said processing component is further configured to perform said relative positioning calculations.

27. The apparatus according to claim 15, wherein said calculations are calculations for a relative positioning between said first antenna and said second antenna, and wherein said processing component is further configured to perform said relative positioning calculations, wherein performing said relative positioning calculations comprises determining double differences from said carrier phase measurements, and wherein said processing component is configured to cause said computational compensation by correcting said double differences.

28. The apparatus according to claim 15, further comprising a sensor providing information indicative of on an orientation of said first antenna.

29. An electronic device comprising:
an apparatus according to claim 15; and
said first antenna.

30. An arrangement comprising:
a first device including an apparatus according to claim 15; and
a second device including said first antenna.

31. A system comprising:
a first device including an apparatus according to claim 15; and
a second device comprising said second antenna.

32. A computer program product in which a program code is stored in a computer readable medium, said program code realizing the following when executed by a processor:
determining an orientation of a mobile first antenna based at least on sensor information;
selecting one of at least two different options for reducing an influence of a difference between said orientation of said first antenna and an orientation of a second antenna on calculations using carrier phase measurements of satellite signals received by said first antenna and said second antenna;
causing a computational compensation of the difference between said orientation of said first antenna and said orientation of said second antenna for reducing an influence of said difference on calculations using carrier phase measurements of satellite signals received by said first antenna and said second antenna in case a first one of said options is selected; and
initiating an alignment of said antennas based on said determined orientation of said first antenna, to obtain equal orientations of said first antenna and said second antenna in case a second one of said options is selected.

33. An apparatus comprising:
means for determining an orientation of a mobile first antenna based at least on sensor information;
means for selecting one of at least two different options for reducing an influence of a difference between said orientation of said first antenna and an orientation of a second antenna on calculations using carrier phase measurements of satellite signals received by said first antenna and said second antenna;
means for causing a computational compensation of the difference between said orientation of said first antenna and said orientation of a second antenna for reducing an influence of said difference on calculations using carrier phase measurements of satellite signals received by said first antenna and said second antenna in case a first one of said options is selected; and
means for initiating an alignment of said antennas based on said determined orientation of said first antenna, to obtain equal orientations of said first antenna and said second antenna in case a second one of said options is selected.

* * * * *